United States Patent [19]

Staendeke et al.

[11] 4,115,522

[45] Sep. 19, 1978

[54] STABILIZED RED PHOSPHORUS AND PROCESS FOR MAKING IT

[75] Inventors: Horst Staendeke; Franz-Josef Dany; Joachim Kandler, all of Erftstadt, Fed. Rep. of Germany

[73] Assignee: Hoechst Aktiengesellschaft, Frankfurt am Main, Fed. Rep. of Germany

[21] Appl. No.: 814,464

[22] Filed: Jul. 11, 1977

[30] Foreign Application Priority Data

Jul. 14, 1976 [DE] Fed. Rep. of Germany ....... 2631532

[51] Int. Cl.$^2$ .................. C01B 25/01; C01B 25/02; C01B 25/04
[52] U.S. Cl. ....................................... 423/322; 149/5; 149/29; 252/400 A; 423/265
[58] Field of Search .................... 423/265, 322; 149/5, 149/29; 252/397, 400 A

[56] References Cited

U.S. PATENT DOCUMENTS

| | | | |
|---|---|---|---|
| 2,359,243 | 9/1944 | Pernet | 423/322 |
| 2,399,120 | 4/1946 | Hurd | 423/322 |
| 2,635,953 | 4/1953 | Silverstein et al. | 252/397 |
| 2,664,344 | 12/1953 | Nordblom et al. | 149/29 |
| 3,488,711 | 1/1970 | Dany et al. | 149/6 |
| 3,974,260 | 8/1976 | Wortman et al. | 423/265 |

FOREIGN PATENT DOCUMENTS 480,572  1/1952  Canada ..................................... 149/29

*Primary Examiner*—O. R. Vertiz
*Assistant Examiner*—Eugene T. Wheelock
*Attorney, Agent, or Firm*—Connolly and Hutz

[57] ABSTRACT

The invention provides stabilized pulverulent red phosphorus. It comprises a homogeneous blend of red phosphorus particles with a size of at most about 2 mm and a metal compound of the second or third group of the Periodic System as an oxidation stabilizer, wherein the metal compound is the neutral aluminum, magnesium, calcium or zinc salt of orthophosphoric acid, the metal compound being present in the homogeneous blend in a proportion of about 0.5 to 5 weight %.

9 Claims, No Drawings

STABILIZED RED PHOSPHORUS AND PROCESS FOR MAKING IT

The present invention relates to stabilized red phosphorus and to a process for making it, wherein red phosphorus, which is preferably in the form of an aqueous suspension, is treated with an orthophosphoric acid metal salt as a stabilizing agent.

It has been described that red phosphorus in moist atmosphere undergoes a chemical surface reaction involving oxidation and disproportionation with the resultant formation of various acids of phosphorus (oxidation stages +1 and +5) and hydrogen phosphide.

As described by Gmelin, Handbuch der anorganischen Chemie, 8th edition (1964), vol. phosphorus, part B, page 83, Verlag Chemie, Weinheim (Bergstrasse), red phosphorus can be stabilized by means of aluminium hydroxide which is precipitated on the phosphorus particles by the consecutive addition of aqueous 10% sodium hydrogen carbonate and aluminum sulfate solutions heated to 55°–60° C. The resulting aqueous suspension is filtered and the filter residue is dried. This process is, however, not satisfactory in respect of the following points. In order to produce a satisfactory stabilizing effect, it is necessary to use relatively large quantities of aluminum hydroxide which is undesirable inasmuch as theycontaminate the phosphorus to an unacceptable extent and adversely affect is further widespread uses.

A further process for stabilizing red phosphorus has been described in U.S. Pat. No. 2,359,243, wherein red phosphorus is suspended in a 0.04 normal solution of sodium aluminate. Next, a stream of air is passed for 10 hours at 85° to 90° C. through the suspension, which is filtered, washed with hot water and dried under vacuum.

A still further process for stabilizing red phosphorus has been disclosed in U.S. Pat. No. 2,635,953, wherein aluminum hydroxide is used in combination with zinc or magnesium hydroxide.

The processes last described do equally not permit red phosphorus to be satisfactorily stabilized against oxidation with the use of a minimum of stabilizer.

The known oxidation stabilizers have more specifically an insufficient thermal stability and liberate water at higher temperatures, which is disadvantageous. In those cases in which plastics material endered flame-retardant by means of red phosphorus, which in turn has an oxidation stabilizer incorporated therein, are to be processed on an extruder, it is an imperative requirement that the oxidation stabilizer combine in itself thermal stability with undecomposability and non-liberation of water, even at temperatures higher than 300° C.

In accordance with our present invention, we have unexpectedly found that red phosphorus can satisfactorily be stabilized by precipitating a minor proportion of an orthophosphoric acid metal salt on the surface of red phosphorus.

The present invention relates more particularly to stabilized pulverulent red phosphorus consisting of a homogeneous blend of red phosphorus particles with a size of at most about 2 mm and a metal compound of the second or third group of the Periodic System as an oxidation stabilizer, wherein the metal compound is the neutral aluminum, magnesium, calcium or zinc salt of orthophosphoric acid, the metal compound being present in the homogeneous blend in a proportion of about 0.5 to 5 weight %, preferably 0.5 to 3 weight %.

The red phosphorus may more preferably be used in the form of particles with a size of about 0.01 to 0.1 mm.

The invention also relates to a process for making stabilized pulverulent red phosphorus consisting of a homogeneous blend of red phosphorus particles with a size of at most 2 mm and a metal compound of the second or third group of the Periodic System as an oxidation stabilizer, which comprises: intimately blending red phosphorus particles with a particle size of at most about 2 mm with about 0.5 to 5 weight % of orthophosphoric acid or sodium hydrogen phosphate, based on phosphorus; suspending the blend in water and heating the resulting suspension to about 60° to 95° C.; gradually admixing the suspension with at least stoichiometric proportions of an aqueous solution of a water-soluble aluminum, magnesium, calcium or zinc salt to cause precipitation of the respective salt of the orthophosphoric acid from the aqueous suspension at a pH of 3.0 to 7.5; filtering the resulting mixture, and drying the filter residue at elevated temperature and, if desired under reduced pressure.

The red phosphorus is more preferably used in the form of particles having a size of about 0.01 to 0.15 mm and its aqueous suspension is preferably heated to a temperature of 80° to 90° C. A further preferred feature of the present process provides for the metal compound to be used in proportions of 0.5 to 5 weight %, based on red phosphorus.

The metal salts of orthophosphoric acid may be made with the use, for example, of $Al_2(SO_4)_3 \cdot 18H_2O$, $Ca(NO_3)_2 \cdot 4H_2O$, $ZnSO_4 \cdot 7H_2O$, or $MgSO_4 \cdot 7H_2O$, the salts specified being preferably used in the form of an aqueous 5 to 20 weight % solution. It is good practice to precipitate the orthophosphates from the aqueous suspension within a certain pH-range inasmuch as these metal orthophosphates are partially soluble in an acid aqueous medium. The aluminum phosphate should more preferably be precipitated from the aqueous suspension at a pH-value of 3.0 to 3.5, and the calcium, magnesium, and zinc phosphates should be precipitated at a pH-value of 7.0 to 7.5.

A further preferred feature of the present process finally provides for the filter residue obtained after filtration of the aqueous suspension to be dried at a temperature of 80° to 130° C.

The stabilized red phosphorus and the process of the present invention for making such phosphorus compare favorably with the prior art products and methods inasmuch as the stabilizer used has an improved thermal stability and is the first to permit the incorporation of red phosphorus in plastics at processing temperatures higher than 250° C.

The following Examples illustrate the invention.

EXAMPLE 1

100 g of fine pulverulent red phosphorus (mean particle size = 0.05 mm) was suspended in 500 cc of water and the suspension was heated to 90° C. with agitation. Next, the suspension was admixed with 5 g of $NaH_2PO_4 \cdot 2H_2O$ and 12 g of $Al_2(SO_4)_3 \cdot 18H_2O$, and a pH of 3 was established by the addition of sodium hydroxide solution of 5 weight % strength. After a post-reaction period of 1 hour, the aqueous suspension was filtered, the filter residue was washed with water and dried at 80° C. in a stream of nitrogen.

The red phosphorus so treated was tested for its stability to oxidation. To this end, a three necked round flask provided with a tubular gas inlet, thermometer, reflux condenser and magnetic stirrer was charged with 450 cc of water and 1 g of red phosphorus, the mixture was heated to 80° C. and 10 l of oxygen per minute was introduced thereinto with agitation. A gas mixture consisting of oxygen and hydrogen phosphide (the latter, which was obtained together with acids of phosphorus of various oxidation stages, was formed by disproportionation of red phosphorus) left the reflux condenser. It was delivered to two series-connected wash bottles, which each contained 100 cc of a 5 weight % aqueous mercury (II) chloride solution. The hydrogen phosphide underwent reaction with the mercury (II) chloride in accordance with the following equation:

$$PH_3 + 3 HgCl_2 \rightarrow P(HgCl)_3 + 3 HCl$$

The quantity of oxo acids of phosphorus present in the aqueous suspension of red phosphorus and the quantity of hydrochloric acid present in the gas washing bottles were determined as an index of the stability to oxidation of red phosphorus.

The content of phosphoric acid and the content of hydrochloric acid were determined by titration. The results obtained are indicated in the Table hereinafter.

EXAMPLE 2

The procedure was as in Example 1 but the aqueous suspension was admixed with agitation with 11.5 g of $Ca(NO_3)_2 \cdot 4H_2O$ which replaced the aluminum sulfate. Next, the whole was admixed with a 5 weight % aqueous sodium hydroxide solution to establish a pH-value of 7. The data determined for the stability to oxidation of the red phosphorus are indicated in the Table hereinafter.

EXAMPLE 3

The procedure was as in Example 1 but the aqueous suspension was admixed with agitation with 14 g of $MgSO_4 \cdot 7H_2O$ which replaced the aluminum sulfate. Next, the whole was admixed with a 5 weight % aqueous sodium hydroxide solution to establish a pH-value of 7. The data determined for the stability to oxidation of the red phosphorus are indicated in the Table hereinafter.

EXAMPLE 4

The procedure was as in Example 1 but the aqueous suspension was admixed with agitation with 11 g of $ZnSO_4 \cdot 7H_2O$ which replaced the aluminum sulfate. Next, the whole was admixed with a 5 weight % aqueous sodium hydroxide solution so as to establish a pH-value of 7. The data determined for the stability to oxidation of the red phosphorus so treated are indicated in the Table hereinafter.

EXAMPLE 5 (Comparative Example)

Unstabilized, untreated pulverulent red phosphorus was tested for its stability to oxidation, in the manner described in Example 1.

The results obtained are indicated in the following Table.

TABLE

| Example | A | B |
|---------|------|-----|
| 1 | 0.27 | 4.2 |
| 2 | 0.39 | 5.2 |
| 3 | 0.51 | 5.8 |
| 4 | 0.52 | 5.8 |
| 5 | 0.53 | 7.7 |

The figures in column A of the above Table indicate the quantity of hydrogen phosphide (mg $PH_3/g \cdot h$) which is evolved on subjecting the phosphorus specimens to oxidation.

The figures in column B of the above Table relate to the acidity of the aqueous phosphorus-containing suspensions, which is caused by the formation of phosphoric acids on subjecting red phosphorus to oxidation (mg $KOH/g \cdot h$).

We claim:

1. In a process for making a homogeneous blend of red phosphorus stabilized against oxidation having a particle size of at most about 2 mm and the neutral aluminum, magnesium, calcium or zinc salt of orthophosphoric acid, the improvement which comprises: intimately blending red phosphorus particles with a size of at most about 2 mm with about 0.5 to 5 weight % of orthophosphoric acid or sodium hydrogen phosphate, based on red phosphorus; suspending the blend in water and heating the resulting suspension to about 60° to 95° C.; gradually admixing the suspension with at least stoichiometric proportions of an aqueous solution of a water-soluble aluminum, magnesium, calcium or zinc salt to cause precipitation of the respective salt of orthophosphoric acid from the aqueous suspension at a pH of 3.0 to 7.5; filtering the resulting mixture, and drying the filter residue comprising a homogeneous blend of red phosphorus and said neutral salt of orthophosphoric acid at elevated temperature.

2. The process as claimed in claim 1, wherein the blend is suspended in water and the resulting suspension heated to 80° to 90° C.

3. The process as claimed in claim 1, wherein the suspension is admixed with at least stoichiometric proportions of 5 to 20 weight % aqueous solution of a water soluble aluminum, magnesium, calcium or zinc salt.

4. The process as claimed in claim 1, wherein the red phosphorus particles have a size of about 0.01 to 0.15 mm.

5. The process as claimed in claim 1, wherein the red phosphorus is blended with 0.5 to 3 weight % of the metal salt of orthophosphoric acid.

6. The process as claimed in claim 1, wherein the water-soluble salt is $Al_2(SO_4)_3 \cdot 18 H_2O$, $Ca(NO_3)_2 \cdot 4 H_2O$, $ZnSO_4 \cdot 7 H_2O$ or $MgSO_4 \cdot 7 H_2O$.

7. The process as claimed in claim 1, wherein the aluminum salt of orthophosphoric acid is precipitated from the aqueous suspension at a pH-value of 3.0 to 3.5.

8. The process as claimed in claim 1, wherein the calcium, magnesium or zinc salt of orthophosphoric acid is precipitated from the aqueous suspension at a pH-value of 7.0 to 7.5.

9. The process as claimed in claim 1, wherein the filter residue is dried at a temperature of 80° to 130° C.

* * * * *